Patented Aug. 24, 1948

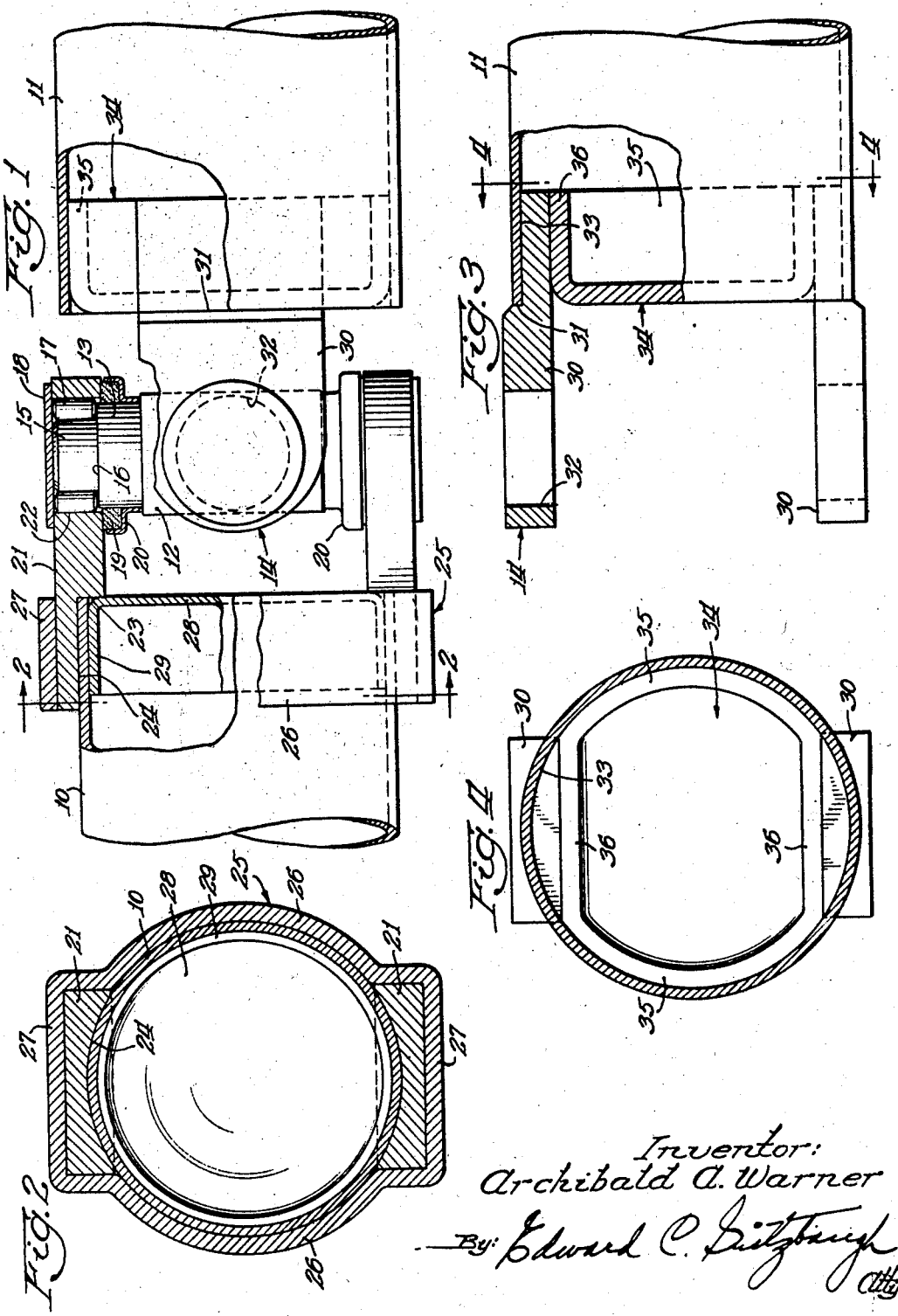

2,447,881

UNITED STATES PATENT OFFICE 2,447,881

UNIVERSAL JOINT

Archibald A. Warner, Rockford, Ill., assignor to Borg-Warner Corporation, Chicago, Ill., a corporation of Illinois Application May 1, 1944, Serial No. 533,583

13 Claims. (Cl. 64—1)

The present invention relates to a hinged joint and for purposes of illustration will be described with reference to a universal joint that is adapted for use in a power train between an engine and a load which is remote from the engine.

One of the principal objects of the present invention is to simplify the construction of a universal joint assembly such as contemplated herein, and to improve the efficiency, operation and dependability of such assembly.

Another of the principal objects hereof is to provide a universal joint that is fabricated from stock items that are commercially available. Also certain of the component parts of the assembly comprise simple stampings and the like. The members of this universal joint, after they have been put together are preferably joined to each other by brazing or otherwise bonding the contacting surfaces of the parts to each other to effect a structure that has a unitary character. As a result of this arrangement the use of solid rods, castings, and upset forgings such as have heretofore been employed is eliminated and the manufacturing cost of the assembly is reduced.

It is also an object of this invention to provide a yoke for a universal joint that includes separate members for the yoke arms disposed in spaced relation to each other at one end of a shaft and secured in position by means that effect a pressed fit between these parts to maintain them against independent movement relative to each other.

Another object hereof is to provide means for positioning the yoke arms at the end of a tubular shaft in such a manner that distortion of the tube is prevented. In this connection the positioning means has a contour which coincides with the contour of the tube and strips.

A further object resides in the provision of yoke arms having shouldered surfaces which contact the shaft, such shoulders providing abutments that engage the end of the shaft.

A still further object is to provide a universal joint yoke for a tubular shaft wherein the means that position and secure the yoke arms to such shaft include means that prevent distortion of the tube that forms the shaft.

Additional objects, aims, and advantages of the present invention will be apparent to persons skilled in the art after the construction and operation of the present universal joint assembly is understood from the within description.

It is preferred to accomplish the numerous objects of this invention and to practice the same in substantially the manner hereinafter fully described and as more particularly pointed out in the appended claims, reference being now made to the accompanying drawings forming a part of this specification, wherein:

Fig. 1 is a longitudinal elevation, partly in section, of a universal joint assembly embodying the instrumentalities of the present invention and showing end regions of two shafts coupled thereto, the elongated shafts being foreshortened;

Fig. 2 is a transverse section thereof taken on the plane of line 2—2 on Fig. 1;

Fig. 3 is a longitudinal section and elevation of the assembly at the right in Fig 1; and Fig. 4 is a transverse section taken on the plane of line 4—4 on Fig. 3.

The drawings are to be understood as being of a more or less schematic character for the purpose of disclosing typical or preferred forms in which the improvements contemplated herein may be made, and in these drawings like reference characters identify the same parts throughout the several views.

The structure illustrated in Fig. 1 comprises shafts 10 and 11, the former of which may be a drive shaft and the latter a driven shaft. These shafts 10 and 11 are preferably elongated hollow tubes at least the end portions of which are of cylindrical cross section, and the walls of these tubes are of a gauge of metal that is sufficient to transmit the power required of the assembly. These tubes may be commercially available stock items or items which are readily manufactured and as will appear hereinafter they require little or no mechanical operations upon them to adapt them for connection with the universal joint that is interposed between their proximate ends.

The spider or cross member of the universal joint comprises a body 12 of any convenient shape with radially disposed trunnions 13 that are arranged in aligned pairs, with the axis of one pair intersecting the axis of the other pair at a right angle. The end portions 15 of these trunnions have reduced diameters providing shoulders 16 within the bearings in the yoke arms for antifriction devices 17 interposed between the reduced portions and the adjacent walls of the bearings. Closure disks 18 are secured in any suitable manner across the outer ends of the bearings to maintain the antifriction devices against dislodgement, and oil seal rings 19 surround the trunnions 13 outside the bearings in the yoke arms and are held in place by annular retainers 20 interposed between the body 12 of the cross member and the inner faces of the yoke arms.

The yoke assembly exemplified in Fig. 2 and at the end of shaft 10 in Fig. 1, comprises a pair of preformed arms 21 that are mounted upon the exterior surface of the tubular shaft 10 at diametrically opposite locations thereon. These arms extend longitudinally of the shaft and project beyond the end thereof towards the other shaft 11, the outer portions of said arms having aligned bores 22 to receive the trunnions of the spider or crossmember 12 hereinbefore described. The arms comprise metal strips of proper dimensions and the under portions thereof that engage the outer surface of the shaft are reduced in thickness to provide shoulders 23 which abut the end of the cylindrical wall of the shaft 10. The under surfaces of the reduced portions of the arms 21 are given arcuate concave shape as shown at 24 in Fig. 2 so that these surfaces coincide with the exterior surface of the shaft.

The yoke arms are maintained in position with relation to the shaft by suitable means that produce a pressed fit between the strips and the tube. In the present instance a strap or band 25 surrounds or encompasses the assembly and is firmly pressed against the exterior surfaces of the tube and strips so that it coincides with the contour that is formed by the tube and the strips. When this retainer member 25 is shaped to the assembly it will have two oppositely disposed arcuate portions 26 contacting the exterior of the tube 10 and two intermediate connecting portions 27 of U-shape that contact the outer faces and the side edges of the strips 21 as shown in Fig. 2. Preferably this band or strap 25 is of a sufficient gauge of metal that it will prevent distortion of the tube from which the shaft 10 is formed.

The end of the tube is sealed to exclude dust and other extraneous matter by a cup-shaped closure 28, the annular flange 29 of which fits tightly into the end of the tube 10.

After the parts have been put together in the manner above described, the assembly is subjected to a brazing or other bonding operation that effectively joins the contacting surfaces to each other and provides an assembly of a unitary character. The contacting surfaces may be prepared by grinding or otherwise if brazing is to be employed.

The yoke assembly which is illustrated in Figs. 3 and 4 and at the end of shaft 11 in Fig. 1 also comprises a plurality of preformed members cooperatively mounted on the tube to provide the yoke 14. The arms of the yoke extend longitudinally of and project from the end of tube 11 and comprise metal strips 30 having reduced portions that are inserted into the tube as shown in Fig. 3 with the shoulders abutting the end of the tube wall. The outer end portions of these strips have aligned bores 32 to receive the trunnions of the cross member 12 and the anti-friction devices 17 in which said trunnions are journaled. The reduced portions of these strips 30 have their outer faces that contact the inner surface of the tube formed into arcuate convex shape as shown at 33 in Fig. 4 so that they conform to the curvature of the tube interior.

In the assembly shown in Figs. 3 and 4 the strips 30 are maintained in position by a preformed cup-shaped member 34 that is inserted into the end of the tube between the strips 30. The lateral flange of this cup-shaped member has a contour that coincides with the contour of the inner surfaces of the tube and strips, such contour including two arcuate portions 35 that contact the interior of the tube 11 and two intermediate portions 36 that contact the inner surfaces of the strips 30 as shown in Fig. 4. This cup-shaped member 34, which is preferably preformed from a relatively heavy gauge of metal by a stamping operation, is forced into the tube 11 to provide a pressed fit between the tube and the strips, and it prevents distortion of the tube as well as a closure for the end thereof. After the parts are assembled they have their contacting surfaces bonded or united to each other by brazing or otherwise to effect a unitary structure. If brazing is to be employed, the contacting surfaces may be prepared by grinding according to the usual practice in such bonding method.

A shaft and yoke assembly such as contemplated herein is of a character that prevents distortion of the tube which forms the shaft, and the component parts of the assembly are stock items and pre-formed metal pieces that permit quick assembly and mass production at a reduced cost as compared with prior structures employing expensive castings and up-set forgings. Furthermore, when the yoke arms have been press fitted and brazed to the tubular shaft they become an integral part thereof.

It is understood that drive and driven shafts 10 and 11 may have other shapes such as square, rectangular, etc. and that drive shaft 10 may be a solid shaft instead of hollow. The functions of the shafts may be interchanged so that shaft 11 is the drive shaft and shaft 10 is the driven shaft. It is also understood that strap 25 or the equivalent thereof may be used merely to hold the strips 21 while they are being secured to shaft 10 and then removed after the fashion of a fixture.

While this invention has been described in detail in some of its present forms or embodiments, it will be apparent to persons skilled in the art, after understanding the improvements, that various changes and modifications may be made therein in addition to those above described without departing from the spirit or scope thereof. It is aimed in the appended claims to cover all such changes and modifications.

I claim:

1. An elongated shaft and a yoke for a joint at the end of said shaft, said yoke including spaced metal strips each having a shoulder on one of its faces, said strips being positioned longitudinally of the shaft with the shoulders abutting the end of the shaft; and means engaging said shaft and strips and retaining said shaft and strips pressed together and thereby said shaft and yoke in assembled relationship, the portions of said retaining means engaging said strips and shaft having a noncircular contour coinciding with the contour of the engaged surfaces of the shaft and strips.

2. A propeller shaft comprising an elongated tube; and a yoke for a universal joint at the end of said tube, said yoke including oppositely disposed strips on the exterior of said tube and projecting beyond the end thereof, each strip being provided with an outer flat surface and an inner curved surface conforming to the curvature of the exterior surface of said tube and a shoulder upon its inner surface that abuts the end of the tube, and means encompassing and conforming to the flat surfaces of said strips and the curvature of the exterior surface of said tube and retaining the tube and strips pressed together and thereby said tube and yoke in assembled relationship.

3. A propeller shaft comprising an elongated tube; and a yoke for a universal joint at the end of said tube, said yoke including oppositely disposed strips inserted into the interior of said tube and projecting beyond the end thereof, each strip having a shoulder on its outer face that abuts the end of the tube; and means engaged with the inner surfaces of the tube and strips and retaining said tube and strips pressed together and thereby said tube and yoke in assembled relationship.

4. A structure as defined in claim 3 wherein the means engaging said shaft and strips and retaining the same pressed together in assembled relationship is provided with oppositely disposed arcuate portions that engage the tube, and has intermediate portions that are counterparts of and engage the proximate faces of the strips.

5. A propeller shaft comprising an elongated tube; and a yoke for a universal joint at the end of said shaft, said yoke comprising strips extending within and having portions of reduced thickness that fit the surface of the tube at the end thereof, said reduced portions providing shoulders that abut the end of the tube; and retaining means engaged with faces of the tube strips and maintaining said tube and strips pressed together and thereby said shaft and yoke in assembled relationship.

6. A propeller shaft comprising an elongated tube; and a yoke for a universal joint at the end of said tube, said yoke comprising strips having reduced portions inserted into the end of the tube, said reduced portions providing shoulders abutting the end of the tube; and a cup-shaped retainer inserted into the end of the tube between the inner portions of said strips, said retainer having oppositely disposed annular portions engaged with the interior face of the tube and also having intermediate flat portions engaged with the proximate inner faces of said strips.

7. A propeller shaft comprising an elongated tube; and a yoke for a universal joint at the end of said shaft, said yoke comprising strips having portions provided with concave surfaces contacting the outer surface of the tube; shoulders on said strips between the concave surfaces and the remaining portions of the strips, said shoulders abutting the end of the tube; and a band pressed on the outer surfaces of the strips and tube for preventing relative movement therebetween.

8. A propeller shaft comprising an elongated tube; and a yoke for a universal joint at the end of said shaft, said yoke comprising strips having portions provided with convex surfaces contacting the inner surface of the tube; shoulders on said strips between the convex surfaces and the remaining portions of the strips, said shoulders abutting the end of the tube; and a retainer inserted into the end of the tube, said retainer having oppositely disposed segmental portions coinciding with and contacting the inner surface of the tube between said strips, said retainer also having other portions connecting the segmental portions that coincide with and contact the inner faces of said strips.

9. A propeller shaft comprising an elongated tube and a yoke for a joint at the end of said shaft, said yoke including spaced metal strips each being provided with a curved face on one side thereof and a flat face on the opposite side thereof and having a shoulder on its curved face, said strips being positioned longitudinally of the tube with the shoulders abutting the end of the tube, and means engaging said shaft and the flat face of each of said strips and retaining said shaft and strips pressed together and thereby said tube and yoke in assembled relationship and also serving to prevent distortion of said tube.

10. A propeller shaft comprising an elongated tube and a yoke for a joint at the end of said shaft, said yoke including spaced metal strips each having a shoulder on one of its faces, said strips being positioned longitudinally of the tube with the shoulders abutting the end of the tube, and means engaging said shaft and strips and retaining said shaft and strips pressed together and thereby said tube and yoke in assembled relationship and also serving to prevent distortion of said tube, said retaining means having a noncircular contour coinciding with the contour formed by the tube and strips.

11. A shaft comprising an elongated tube and a yoke for a joint at the end of said shaft, said yoke including spaced metal strips each having a shoulder on one of its faces, said strips being positioned longitudinally of the shaft with the shoulders abutting the tube, and a retaining member for maintaining said tube and yoke in assembled relationship and comprising spaced curved surfaces engaging said tube and spaced other surfaces of different form than said curved surfaces and each being disposed intermediate said spaced curved surfaces and coinciding with and contacting faces on said strips for retaining said tube and strips pressed together.

12. A shaft comprising an elongated tube and a yoke for a joint at the end of said shaft, said yoke comprising spaced strips having portions provided with curved surfaces contacting a surface of the tube; shoulders on said strips abutting the end of the tube; and a retainer having oppositely disposed curved segmental portions coinciding with and engaging the aforesaid surface of said tube, said retainer also having other portions connecting the segmental portions that coincide with and contact other faces of said strips.

13. A shaft comprising an elongated cylindrical tube and a yoke for a joint at the end of the shaft, said yoke comprising spaced strips each having on opposite sides thereof a plane surface and a curved surface, the curved surfaces on said strips engaging one of the two inner and outer curved surfaces of the tube, a retainer for maintaining said strips and tube in assembled relationship and comprising oppositely disposed segmental portions presenting spaced curved surfaces coinciding with and contacting the said one curved surface of the tube and having other portions connecting said segmental portions and presenting plane surfaces engaging similar surfaces on said strips.

ARCHIBALD A. WARNER.

REFERENCES CITED

The following references are of record in the file of this patent:

UNITED STATES PATENTS

| Number | Name | Date |
| --- | --- | --- |
| 634,540 | Prior | Oct. 10, 1899 |
| 1,093,822 | Blum | Apr. 21, 1914 |
| 1,569,838 | Macdonald | Jan. 12, 1926 |
| 1,923,649 | Warner | Aug. 22, 1933 |
| 2,037,947 | Swenson | Apr. 21, 1936 |
| 2,067,282 | Padgett | Jan. 12, 1937 |

FOREIGN PATENTS

| Number | Country | Date |
| --- | --- | --- |
| 284,089 | Great Britain | 1928 |
| 326,057 | France | Feb. 10, 1903 |
| 634,540 | Germany | Oct. 10, 1899 |